United States Patent [19]
Harasaki

[11] Patent Number: 4,669,776
[45] Date of Patent: Jun. 2, 1987

[54] FRONT BODY CONSTRUCTION FOR MOTOR VEHICLE

[75] Inventor: Hayatsugu Harasaki, Hiroshima, Japan

[73] Assignee: Mazda Motor Corporation, Hiroshima, Japan

[21] Appl. No.: 839,864

[22] Filed: Mar. 14, 1986

[30] Foreign Application Priority Data

Mar. 19, 1985 [JP] Japan .................................. 60-56346
Mar. 19, 1985 [JP] Japan ............................. 60-40770[U]
Mar. 19, 1985 [JP] Japan ............................. 60-40771[U]
Mar. 19, 1985 [JP] Japan ............................. 60-40773[U]

[51] Int. Cl.$^4$ .......................................... B62D 21/00
[52] U.S. Cl. .................................... 296/194; 296/192
[58] Field of Search ..................... 296/194, 193, 192, 296/198, 203, 185, 186

[56] References Cited

U.S. PATENT DOCUMENTS 4,270,793  6/1981  Harasaki ............................... 296/192
4,332,187  6/1982  Imai et al. ............................ 296/192
4,469,368  9/1984  Eger ..................................... 296/194
4,545,612  10/1985  Harasaki ............................. 296/185

FOREIGN PATENT DOCUMENTS 55-22203  2/1980  Japan .
57-63785  4/1982  Japan .
58-126275  8/1983  Japan .

Primary Examiner—Robert R. Song
Attorney, Agent, or Firm—Burns, Doane, Swecker & Mathis

[57] ABSTRACT

A front body construction for a motor vehicle, including a dash panel extending in a sidewise direction of a vehicle body, a pair of cowl side panels each forming a front portion of each of a pair of side walls of a cabin, a pair of front pillars each disposed inwardly of a rear portion of each of the cowl side panels in the sidewise direction of the motor vehicle and a pair of reinforcing members each coupled, at its front end, with the dash panel and, at its rear end, with a rear end portion of the front pillars. Each of the reinforcing members defines, at its front portion, a first closed cross section in cooperation with each of the cowl side panels and, at its rear portion, a second closed cross section in cooperation with each of the front pillars.

12 Claims, 22 Drawing Figures

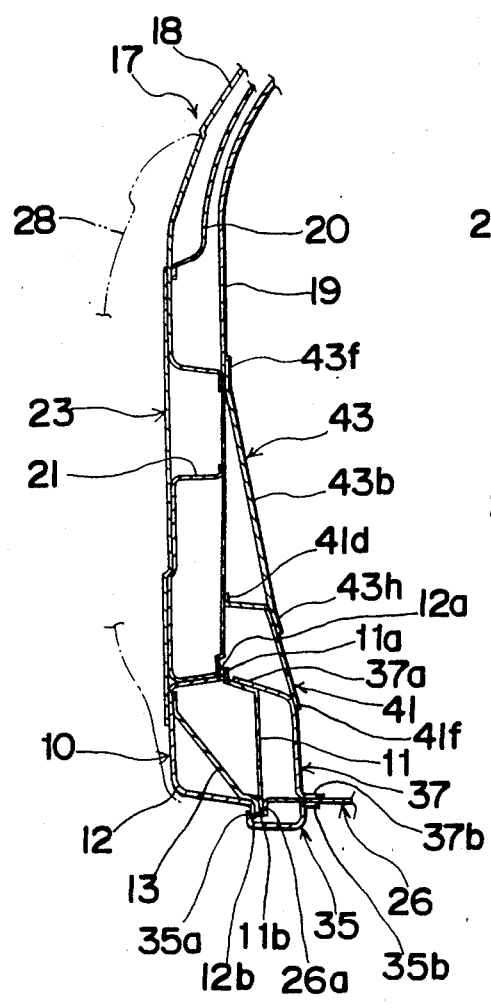
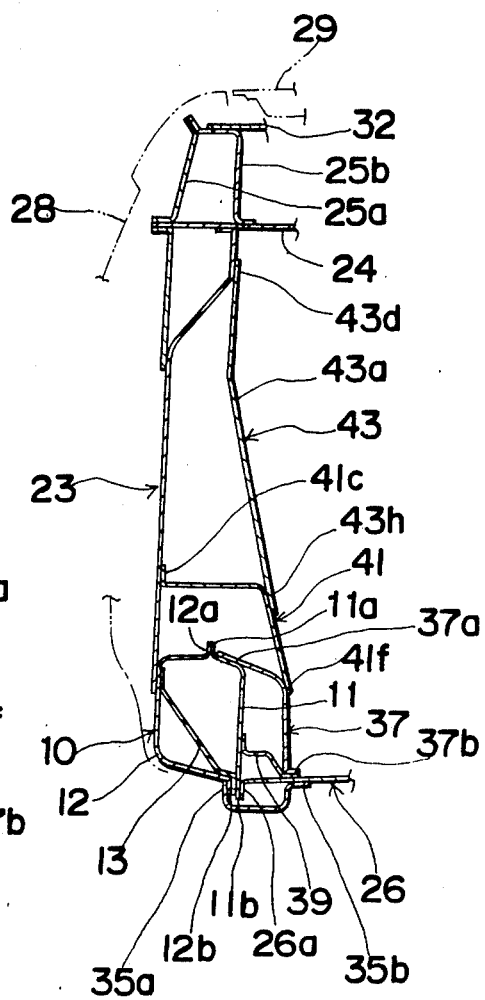

FRONT BODY CONSTRUCTION FOR MOTOR VEHICLE

BACKGROUND OF THE INVENTION

The present invention generally relates to motor vehicles and more particularly, to a front body construction for the motor vehicles.

Conventionally, a so-called canvas-top type motor vehicle 1 shown in FIG. 1 is not provided with a roof panel for supporting an upper portion of each of a pair of front pillars 2 disposed at a front portion of a vehicle body of the motor vehicle 1. Thus, such a problem arises in the known motor vehicle 1 that bending rigidity of the front portion of the vehicle body drops if a base portion of each of the front pillars 2 is not reinforced sufficiently in association with a side sill, a floor panel, a dash panel, a cowl side panel, etc.

In order to solve this problem, several front body constructions for reinforcing the front portion of the vehicle body have been proposed in, for example, Japanese Utility Model Laid-Open Publication Nos. 126275/1983, 63785/1982 and 22203/1980 as shown in FIGS. 2, 3 and 4, respectively. In the prior art front body construction of FIG. 2, a pair of the front pillars 2 disposed at opposite transversal sides of the vehicle body are coupled with each other by a reinforcing member 3. In the known front body construction of FIG. 3, a side sill 4, each of the front pillars 2 and a dash panel 5 are coupled with each other. Meanwhile, in the prior art front body construction of FIG. 4, the side sill 4 and a front side member 6 are coupled with each other by a reinforcing member 7.

SUMMARY OF THE INVENTION

Accordingly, an essential object of the present invention is to provide a front body construction for a motor vehicle, in which coupling strength between each of a pair of front pillars and a dash panel both disposed at a front portion of a vehicle body of the motor vehicle is increased and strength of the front pillars is also raised such that bending rigidity of the front portion of the vehicle body is improved, with substantial elimination of the disadvantages inherent in conventional front body constructions of this kind.

A further object of the present invention is to provide a front body construction of the above described type in which a coupling strength between each of a pair of the front pillars and a pair of cowl side members (reinforcing members) disposed at the front portion of the vehicle body is increased.

Another object of the present invention is to provide a front body construction of the above described type in which a coupling strength between a pair of side sills and a floor panel both disposed at the front portion of the vehicle body and a coupling strength between the dash panel and each of a pair of cowl side panels disposed at the front portion of the vehicle body are increased.

In order to accomplish these objects of the present invention, a front body construction for a motor vehicle, embodying the present invention comprises: a dash panel which extends in a sidewise direction of a vehicle body of said motor vehicle so as to form a front face of a cabin of said motor vehicle; a pair of cowl side panels each of which is coupled, at a front end thereof, with said dash panel so as to form a front portion of each of a pair of side walls of said cabin; a pair of front pillars each of which is disposed inwardly of a rear portion of each of said cowl side panels in the sidewise direction of said vehicle body; and a pair of reinforcing members each of which is coupled, at a front end thereof, with said dash panel and is coupled, at a rear end thereof, with a rear end portion of each of said front pillars; said reinforcing members each defining, at a front portion thereof, a first closed cross section in cooperation with each of said cowl side panels and each defining, at a rear portion thereof, a second closed cross section in cooperation with each of said front pillars.

Thus, in the front body construction of the present invention, each of the reinforcing members is coupled with the dash panel and each of the front pillars such that the front portion and the rear portion of each of the reinforcing members define the first and second closed cross sections in cooperation with each of the cowl side panels and each of the front pillars respectively. Accordingly, in accordance with the present invention, since the front pillars and the dash panel are coupled with each other by the reinforcing members, coupling strength between the front pillars and the dash panel is increased and strength of the front pillars is also raised, thereby resulting in improvement of bending rigidity of the vehicle body and reduction of vibrations of the vehicle body.

BRIEF DESCRIPTION OF THE DRAWINGS

These objects and features of the present invention will become apparent from the following description taken in conjunction with the preferred embodiment thereof with reference to the accompanying drawings, in which:

FIGS. 6, 7, 8 and 9 are sectional views taken along the lines VI—VI, VII—VII, VIII—VIII and IX—IX in FIG. 5, respectively;

FIG. 10c is a sectional view taken along the line Xc—Xc in FIG. 10a;

FIG. 11b is a sectional view taken along the line XIb—XIb in FIG. 11a;

Before the description of the present invention proceeds, it is to be noted that like parts are designated by like reference numerals throughout several views of the accompanying drawings.

DETAILED DESCRIPTION OF THE INVENTION

Figure 1:
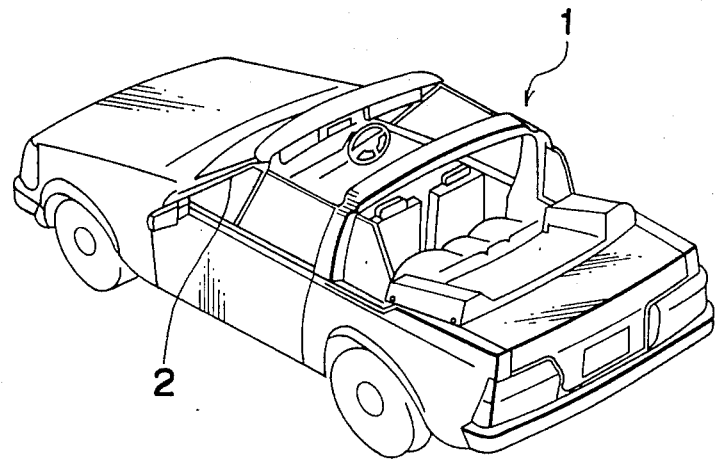
FIG. 1 is a perspective view of a prior art canvas-top type motor vehicle (already referred to)
Figure 2:
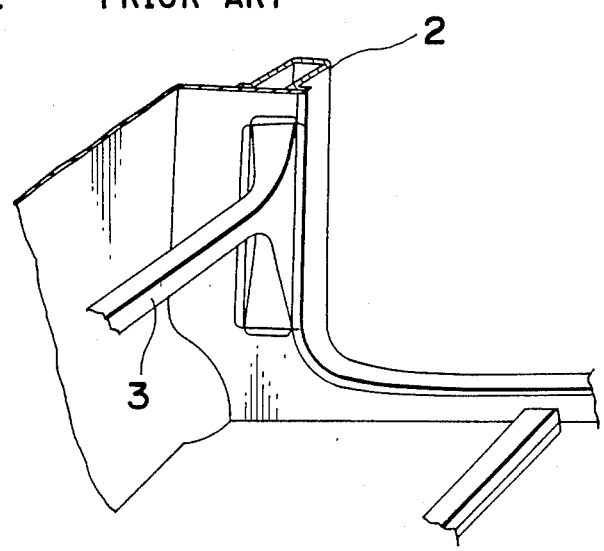
FIGS. 2, 3 and 4 are fragmentary perspective views of three prior art front body constructions for the motor vehicle of FIG. 1, respectively (already referred to)
Figure 3:
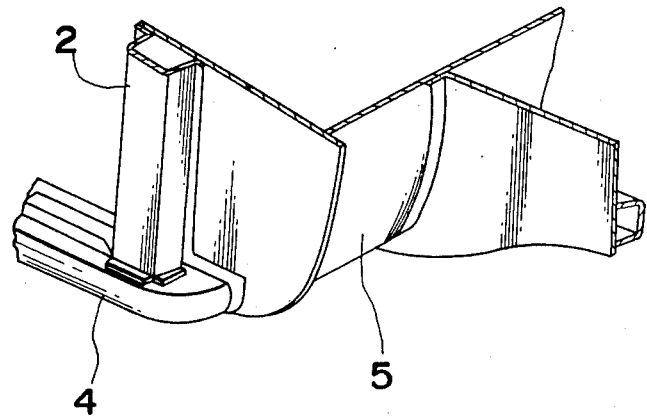
Figure 4:
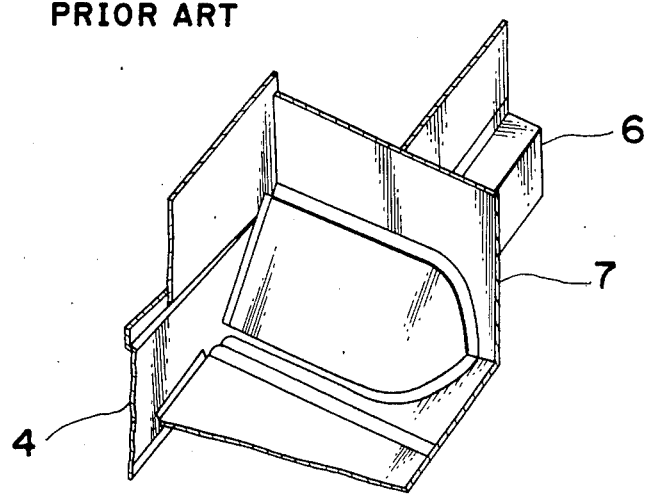

Referring now to the drawings, there is shown in FIGS. 5 to 13, a front body construction K for a motor vehicle, according to one preferred embodiment of the present invention.

Figure 5:
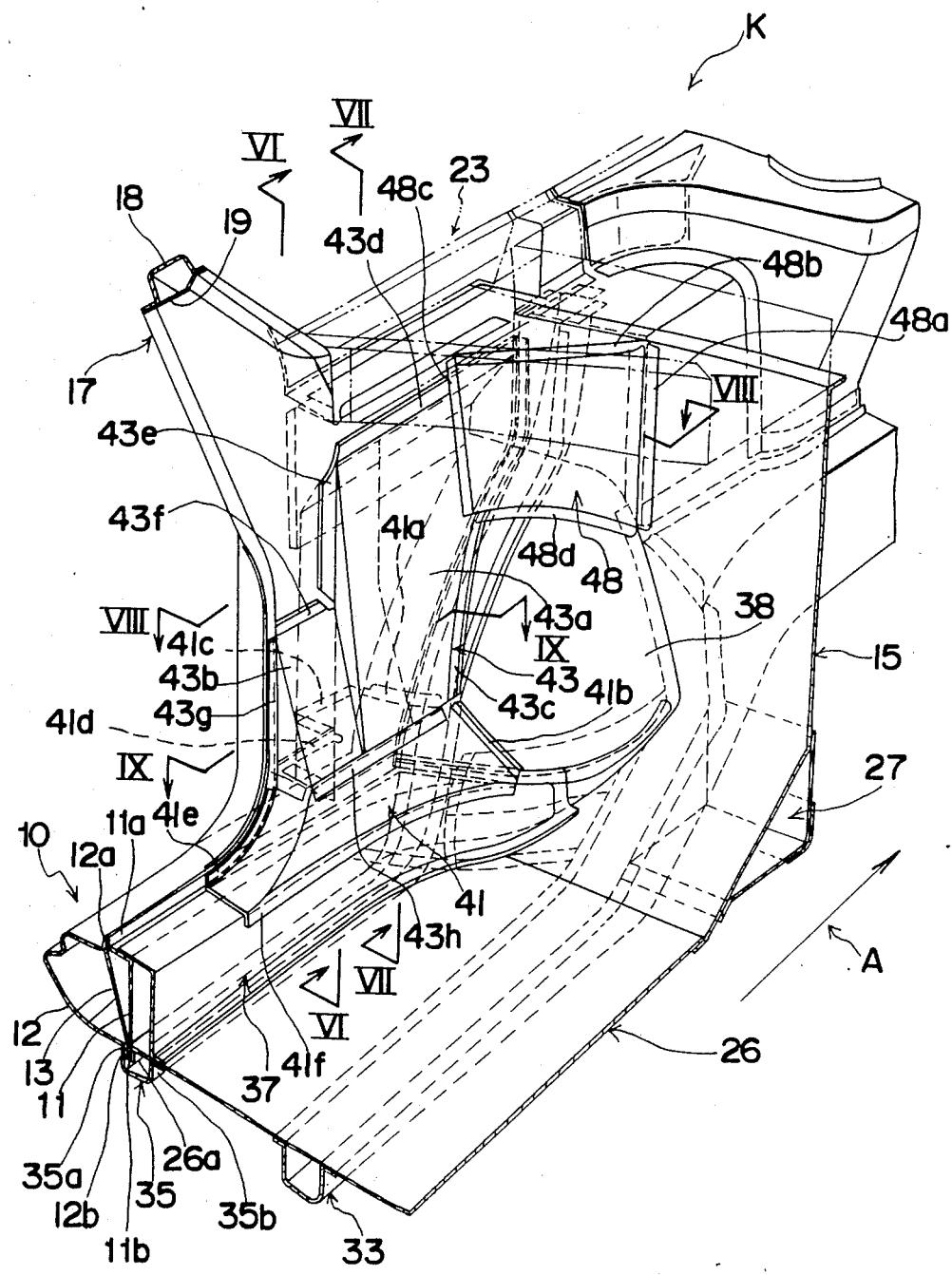
FIG. 5 is a perspective view of a left side of a front body construction for a motor vehicle, according to the present invention as viewed from a cabin of the motor vehicle.

It should be noted here that since the front body construction K is symmetrical with respect to the longitudinal center line of a vehicle body of the motor vehicle, only one of opposite transversal sides of the front body construction K, i.e., only a left side of the front body construction K will be described for the sake of brevity as best shown in FIG. 5, hereinbelow. It is to be further noted that the motor vehicle is arranged to run forwardly in the direction of the arrow A as shown in FIGS. 5, 8 and 9.

As shown in FIGS. 5 to 7, the front body construction K includes a side sill 10, a reinforcement 13, a dash panel 15 and a front pillar 17. The side sill 10 includes an inner member 11 and an outer member 12 so as to extend in the longitudinal direction of the vehicle body such that a closed cross section is defined by the inner member 11 and the outer member 12. The inner member 11 has upper and lower jointing flanges 11a and 11b formed at its upper and lower ends, respectively, while the outer member 12 has upper and lower jointing flanges 12a and 12b formed at its upper and lower ends, respectively. The upper and lower jointing flanges 11a and 11b of the inner member 11 are, respectively, attached to the upper and lower jointing flanges 12a and 12b of the outer member 12 so as to define the closed cross section of the side sill 10. A reinforcement 13 is provided in the side sill 10. An upper end of the reinforcement 13 is attached to the outer member 12, while a lower end of the reinforcement 13 is attached to the lower jointing flanges 11b and 12b so as to be gripped between the jointing flanges 11b and 12b.

Meanwhile, the dash panel 15 is attached, at its lower portion, to front ends of the side sill 10 and a floor panel 26 to be described later and has an upper portion extending upwardly. The dash panel 15 extends in the sidewise direction of the vehicle body so as to form a front face of a cabin of the motor vehicle. The front pillar 17 is provided rearwardly of the dash panel 15 over a predetermined distance therefrom so as to be disposed inwardly of a rear portion of a cowl side panel 23 in the sidewise direction of the vehicle body as shown in FIGS. 8 and 9 and is attached, at its lower end, to a front upper face of the side sill 10 as shown in FIGS. 5 and 6. The front pillar 17 includes an outer member 18 and an inner member 19. As shown in FIG. 6, the outer and inner members 18 and 19 define a closed cross section at an upper portion of the front pillar 17, while the inner member 19 and a rear portion of the cowl side panel 23 define a closed cross section at a lower portion of the front pillar 17 such that the front pillar 17 extends in the vertical direction of the vehicle body. A reinforcement 20 (FIG. 6) is provided the front pillar 17 so as to be attached to the outer and inner members 18 and 19. A reinforcement 21 (FIG. 6) is attached to the inner member 19 and the cowl side panel 23.

Figure 8:
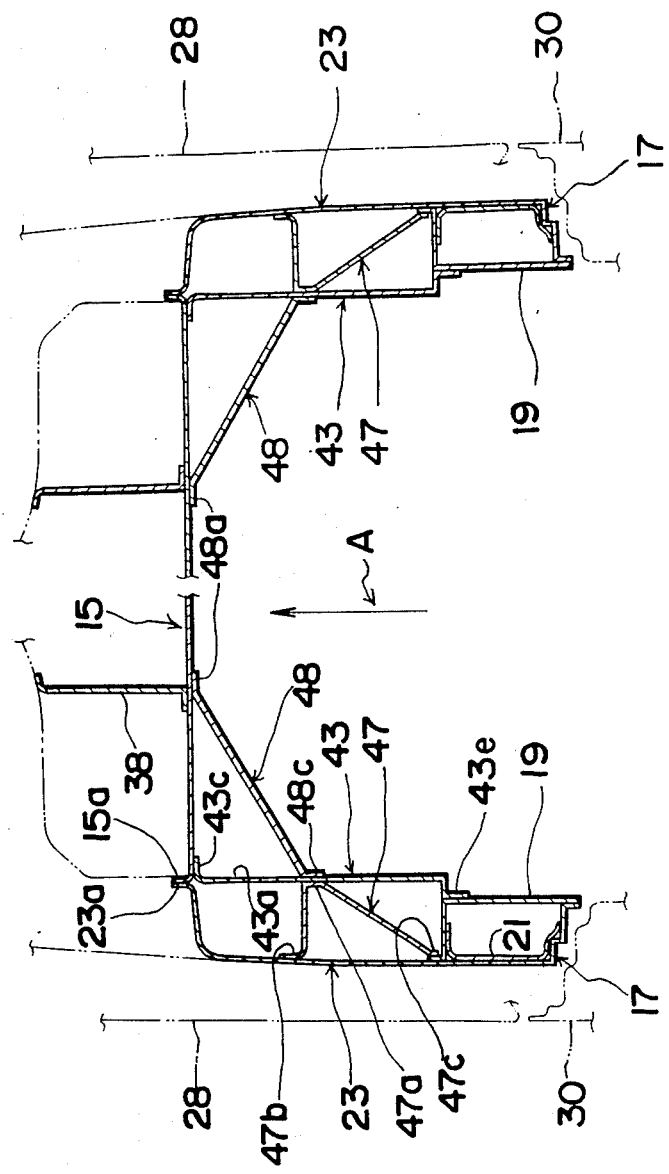
Figure 9:
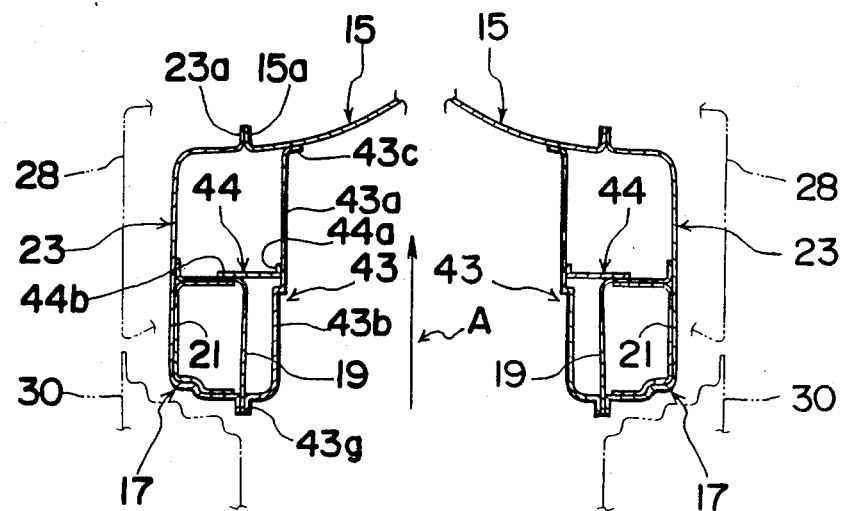

As shown in FIGS. 8 and 9, a front end 23a of the cowl side panel 23 is attached to a jointing flange 15a of the dash panel 15, which jointing flange 15a is disposed at a side edge of the dash panel 15. The cowl side panel 23 is attached, at its lower portion, to the outer member 12 of the side sill 10 and is attached, at its upper portion, to the outer member 18 of the front pillar 17 and a wheel apron 24 (FIGS. 6 and 7). The cowl side panel 23 is further attached, at its rear portion, to the inner member 19 of the front pillar 17 so as to form a front portion of a side wall of the cabin as shown in FIGS. 8 and 9. As shown in FIG. 7, wheel-apron reinforcements 25a and 25b for reinforcing the wheel apron 24 are attached to an upper portion of the wheel apron 24 so as to define a closed cross section. A cowl panel 32 is attached to an upper face of the wheel-apron reinforcement 25b.

As shown in FIGS. 6 and 7, a side edge 26a of the floor panel 26 is attached to the lower jointing flange 11b of the inner member 11 of the side sill 10. A torque box 27 (FIG. 5) is provided for coupling a front end of the side sill 10 with a front end of a front frame 33 extending in the longitudinal direction of the vehicle body and is attached to one of opposite faces of the dash panel 15 remote from the cabin. Meanwhile, reference numerals 28, 29 and 30 represent a front fender (FIGS. 6 to 9), a bonnet (FIG. 7) and a side door (FIGS. 8 and 9), respectively.

Figure 10A:
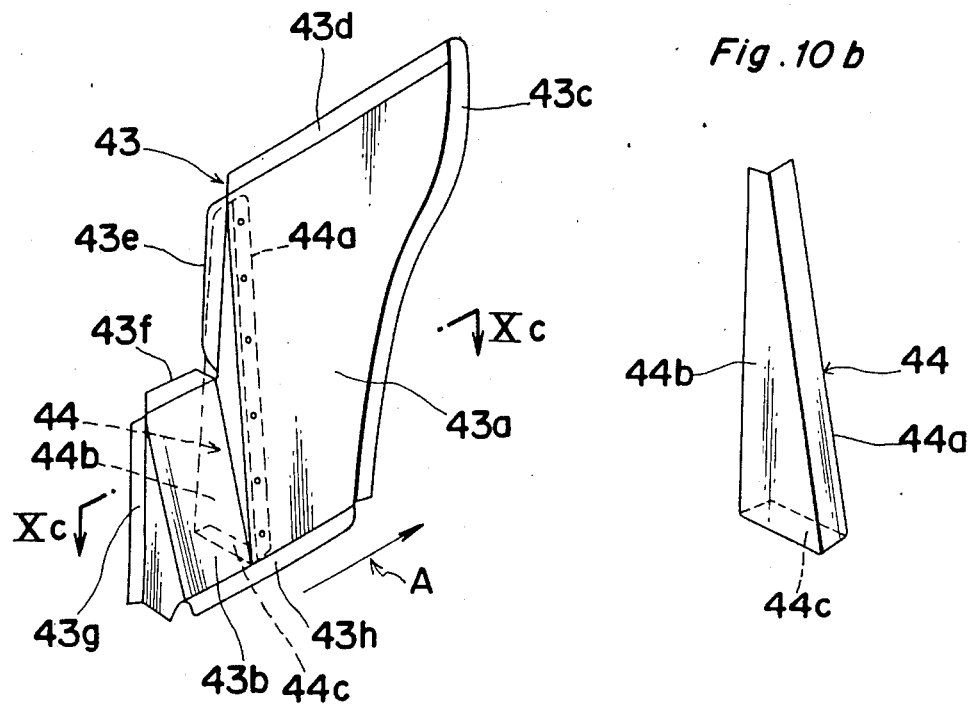
FIG. 10a is a perspective view of a first reinforcing member employed in the front body construction of FIG. 5.
Figure 10B:
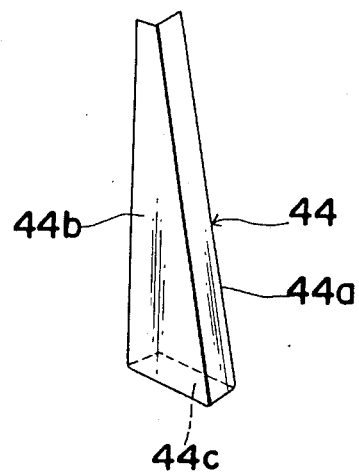
FIG. 10b is a perspective view of an auxiliary reinforcing member employed in the front body construction of FIG. 5.
Figure 10C:
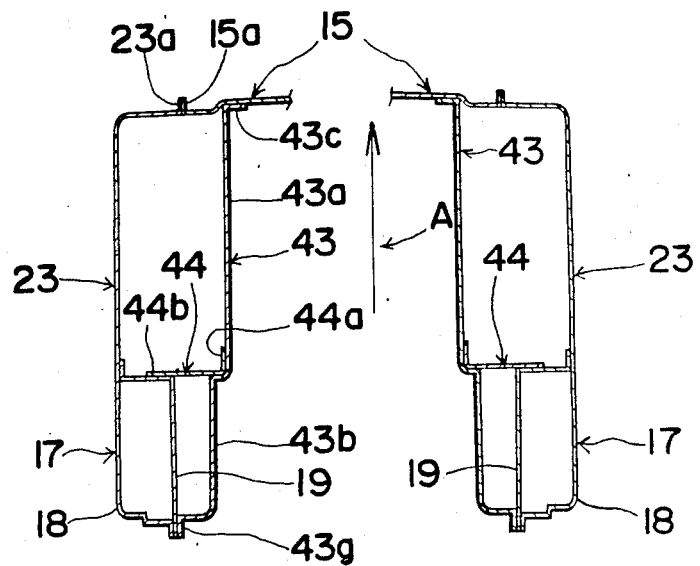

Furthermore, the front body construction K includes a first reinforcing member 43, a second reinforcing member 41, a first gusset 47, a second gusset 48 and first and second side sill reinforcements 35 and 37 for reinforcing the side sill 10. Referring to FIGS. 10a to 10c, the first reinforcing member 43 is provided between the dash panel 15 and the front pillar 17 and above the side sill 10 and has a front portion 43a, a rear portion 43b and a lower end 43h. The front portion 43a has a front end 43c, an upper end 43d and a rear end 43e, while the rear portion 43b has an upper end 43f and a rear end 43g. As shown in FIG. 7, the front portion 43a and the cowl side panel 23 form a closed cross section juxtaposed relative to the side sill 10. Meanwhile, as shown in FIG. 6, the rear portion 43b, a lower portion of the front pillar 17 and an upper face of the side sill 10 define a closed cross section. As shown in FIGS. 5, 8 and 9, the front end 43c of the front portion 43a is attached to an upper portion of the dash panel 15 and a wheel housing 38. As shown in FIG. 7, the upper end 43d of the front portion 43a is attached to an upper portion of the cowl side panel 23. Meanwhile, as shown in FIG. 5, the rear end 43e of the front portion 43a is attached to the inner member 19 of the front pillar 17. The upper end 43f and the rear end 43g of the rear portion 43b are attached to a rear end portion of the inner member 19 of the front pillar 17 as shown in FIGS. 5, 8 and 9. The lower end 43h of the first reinforcing member 43 is attached to the second reinforcing member 41 as shown in FIGS. 5, 6 and 7.

An auxiliary reinforcing member 44 having a substantially triangular shape is attached, at its one side edge 44a, to a boundary of the front portion 43a and the rear portion 43b. The other side edge 44b of the auxiliary reinforcing member 44 is attached to the inner member 19 as shown in FIG. 10c. A lower end 44c of the auxiliary reinforcing member 44 is attached to the second reinforcing member 41.

Figure 11A:
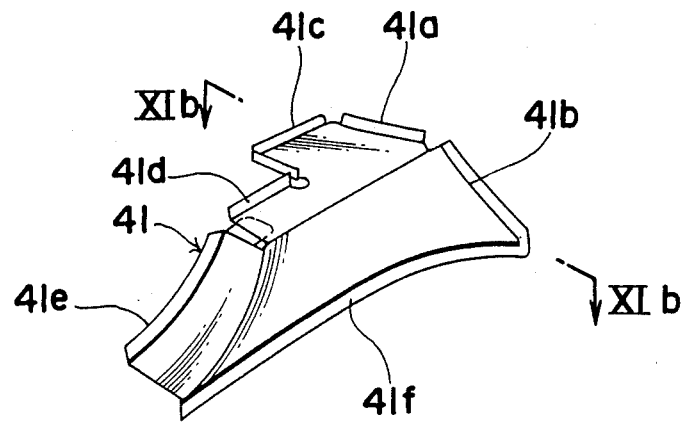
FIG. 11a is a perspective view of a second reinforcing member employed in the front body construction of FIG. 5.
Figure 11B:
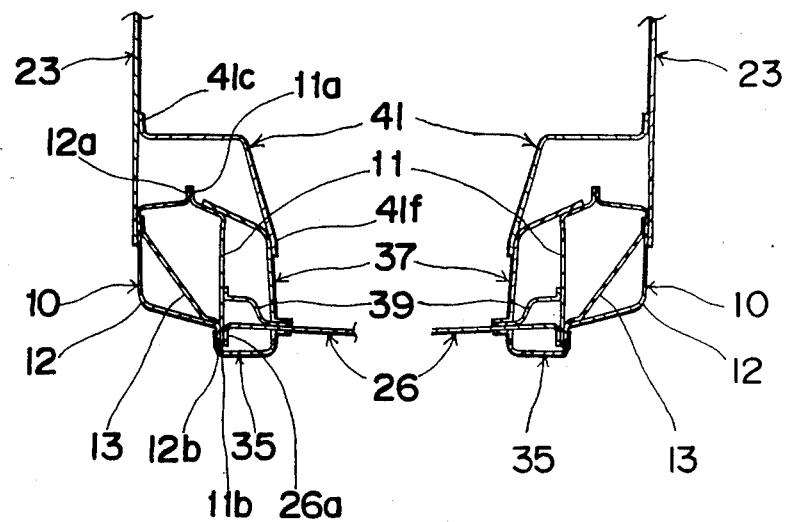
Figure 12A:
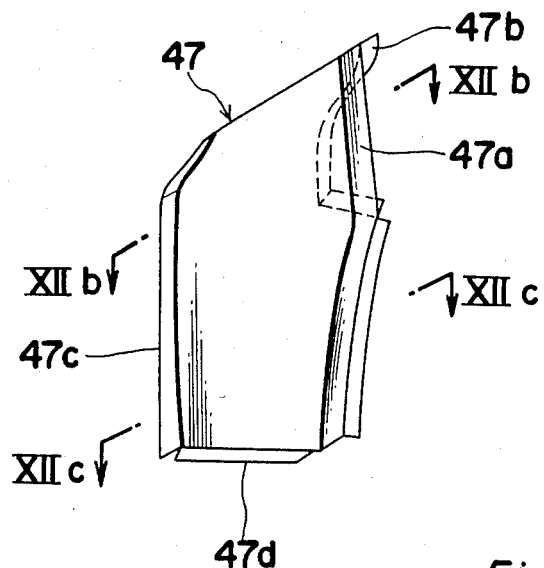
FIG. 12a is a perspective view of a first gusset employed in the front body construction of FIG. 5.
Figure 12B:
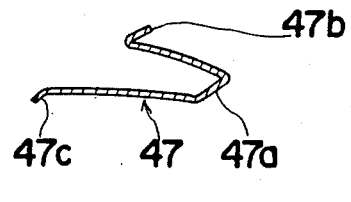
FIGS. 12b and 12c are sectional views taken along the line XIIb—XIIb and XIIc—XIIc in FIG. 12a, respectively.
Figure 12C:
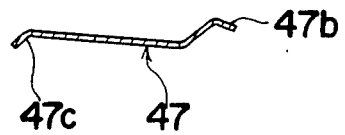
Figure 12D:
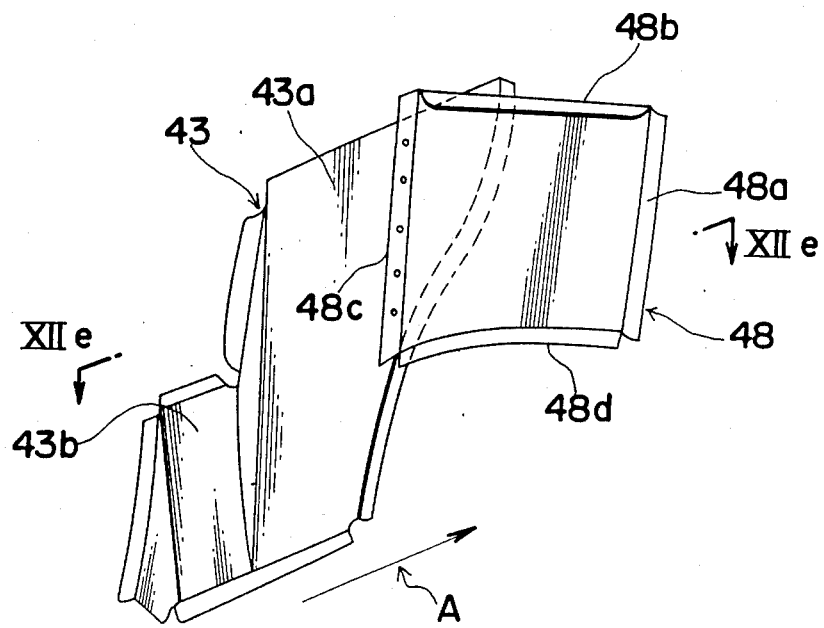
FIG. 12d is a perspective view of a second gusset employed in the front body construction of FIG. 5.

Referring to FIGS. 11a and 11b, the second reinforcing member 41 is of a substantially L-shaped cross section and has a front upper flange 41a, a front lower flange 41b, a forward side flange 41c, an intermediate side flange 41d, a rearward side flange 41e and a lower side flange 41f. The front upper flange 41a is attached to the dash panel 15 and the front lower flange 41b is attached to the wheel housing 38 as shown in FIG. 5. The forward side flange 41c is attached to the cowl side panel 23 as shown in FIG. 11b, while the intermediate side flange 41d is attached to an inner face of a rear end portion of the inner member 19 of the front pillar 17 as shown in FIGS. 5 and 6. The rearward side flange 41e is attached to the upper jointing flange 11a of the inner member 11 of the side sill 10 as shown in FIG. 5. Meanwhile, the lower side flange 41f is attached to the second side-sill reinforcement 37 as shown in FIGS. 6 and 7. The second reinforcing member 41 defines, at its front portion, a closed cross section in cooperation with the cowl side panel 23 as shown in FIGS. 7 and 11b and defines, at its rear portion, a closed cross section in cooperation with the front pillar 17 as shown in FIG. 6 so as to increase rigidity of the front body construction K.

Figure 12E:
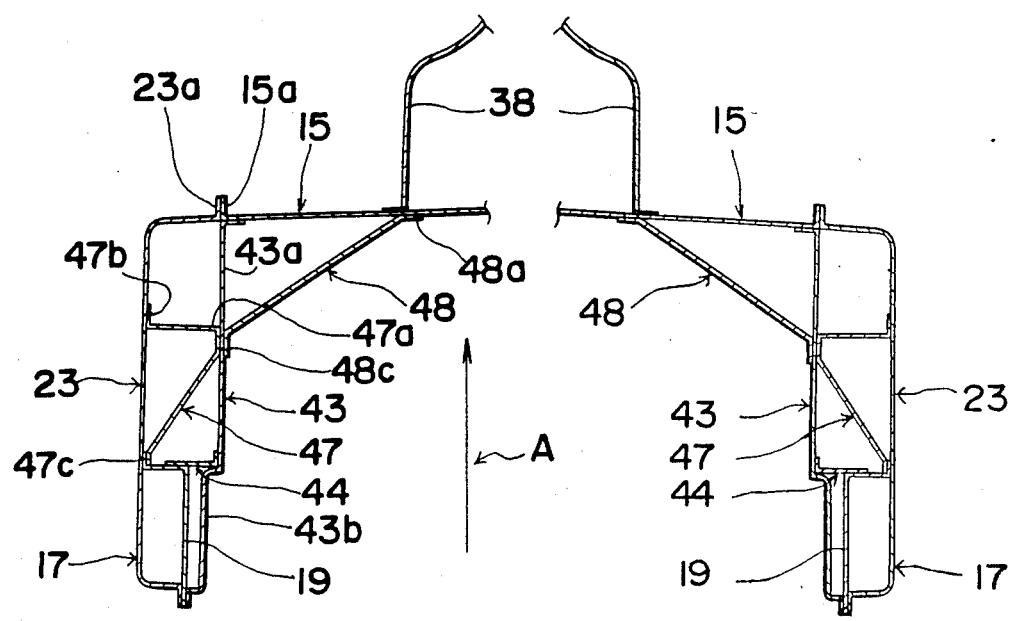
FIG. 12e is a sectional view taken along the line XIIe—XIIe in FIG. 12d.

Referring to FIGS. 12a to 12e, there are shown the first and second gazettes 47 and 48. As also shown in FIG. 8, the first gusset 47 has a substantially hat-like cross section and is disposed in the closed cross section defined by the first reinforcing member 43 and the cowl side panel 23. The first gusset 47 has a projecting portion 47a, a front end 47b, a rear end 47c and a lower end 47d. As shown in FIG. 12e, the front end 47b of the first gusset 47 is attached to the cowl side panel 23 and the wheel housing 38. The rear end 47c is attached to the inner member 19 of the front pillar 17 as shown in FIG. 12e. The lower end 47d is attached to an upper face of the second reinforcing member 41.

Meanwhile, the second gusset 48 has a front end 48a, an upper end 48b, a rear end 48c, and a lower end 48d. As shown in FIG. 5, the second gusset 48 is at a corner formed by the first reinforcing member 43 and the dash panel 15 so as to confront the cabin. The front end 48a is attached to the dash panel 15 as shown in FIG. 12e. The upper end 48b is attached to the cowl panel 32. Meanwhile, the rear end 48c is attached to the first reinforcing member 43 so as to confront, through the first reinforcing member 43, the projecting portion 47a of the first gazette 47 as shown in FIG. 12e. The lower end 48d is attached to the wheel housing 38 as shown in FIG. 5.

Figure 13A:
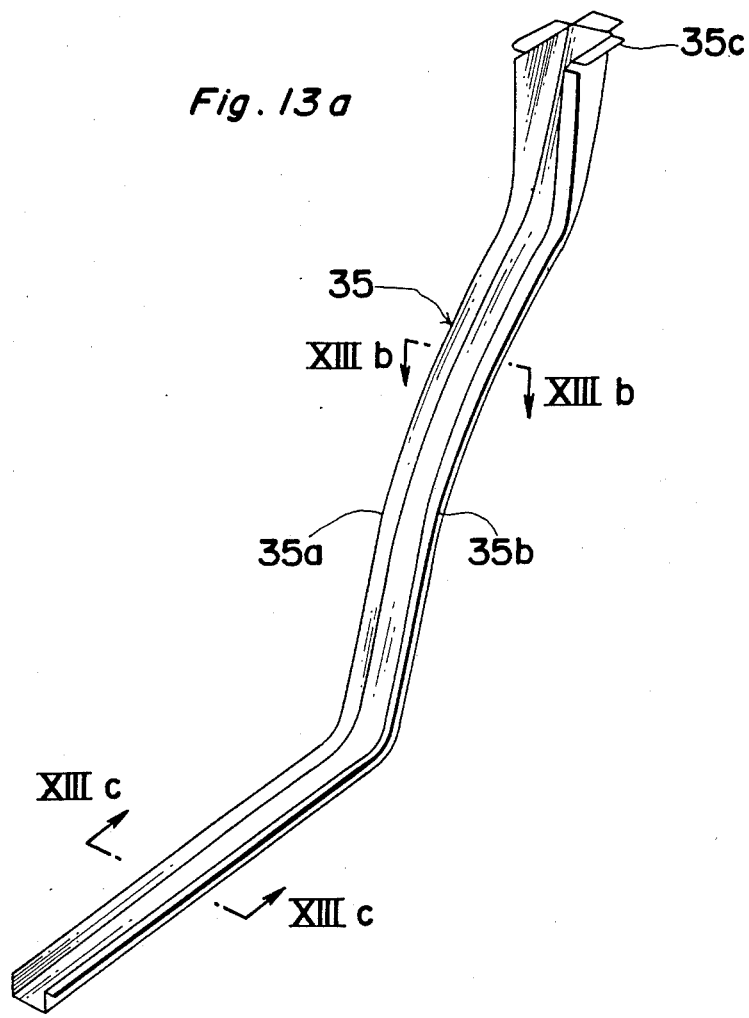
FIG. 13a is a perspective view of a first side-sill reinforcement employed in the front body construction of FIG. 5.
Figure 13B:
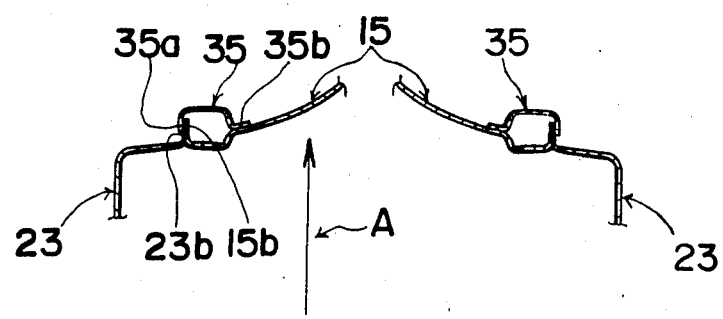
FIGS. 13b and 13c are sectional views taken along the lines XIIIb—XIIIb and XIIIc—XIIIc, respectively.
Figure 13C:
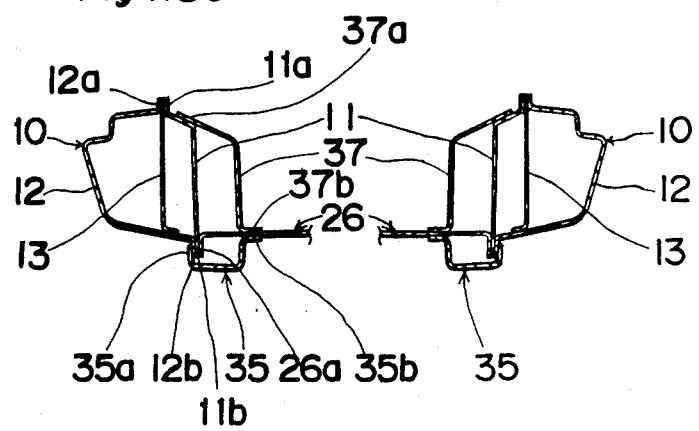

Referring to FIGS. 13a to 13c, the first side-sill reinforcement 35 is of a substantially U-shaped cross section and has one side edge 35a, the other side edge 35b and an upper flange 35c. As shown in FIG. 13c, at a rear portion of the first side-sill reinforcement 35, the side edge 35a is attached to the lower jointing flange 12b of the outer member 12 of the side sill 10, while the other side edge 35b is attached to a lower face of the floor panel 26 such that the lower jointing flanges 11b and 12b of the inner and outer members 11 and 12 are disposed between the side edge 35a and the other side edge 35b. A front portion of the first side-sill reinforcement 35 extends upwardly. As shown in FIG. 13b, at the front portion of the first side-sill reinforcement 35, the other side edge 35b, is attached to the dash panel 15, while the side edge 35a is attached to the jointing flange 23b of the cowl side panel 23 such that a jointing flange 15b of the dash panel 15 and the jointing flange 23b are disposed between the side edge 35a and the other side edge 35b, with the jointing flange 15b being attached to the jointing flange 23b. Thus, a closed cross section is defined by the first side-sill reinforcement 35 and the dash panel 15 as shown in FIG. 13b. The upper flange 35c is attached to a lower face of the wheel apron 24. Namely, at the lower portion of the first side-sill reinforcement 35, the side edge 35a is attached to the lower jointing flange 12b of the outer member 12 together with the lower end of the reinforcement 13, the lower jointing flange 11b of the inner member 11 and the side edge 26a of the floor panel 26 as shown in FIG. 13c. Meanwhile, at the upper portion of the first side-sill reinforcement 35, the side edge 35a is attached to the jointing flange 23b of the cowl side panel 23 together with the jointing flange 15b of the dash panel 15 and thus, rigidity of the side sill 10 is increased by the first side-sill reinforcement 35.

As shown in FIGS. 6 and 7, the second side-sill reinforcement 37 is of a substantially L-shaped cross section and has an upper edge 37a and a lower edge 37b. As shown in FIG. 5, the second side-sill reinforcement 37 is attached, through the dash panel 15, to the torque box 27. Furthermore, as shown in FIGS. 6 and 7, the upper edge 37a is attached to an upper portion of the inner member 11 of the side sill 10, while the lower edge 37b is attached to an upper face of the floor panel 26 such that the lower edge 37b confronts, through the floor panel 26, the other side edge 35b of the first side-sill reinforcement 35. Thus, the second side-sill reinforcement 37, the inner member 11 of the side sill 10 and the floor panel 26 define a closed cross section in which a reinforcement 39 is provided.

Accordingly, in accordance with the present invention, the front body construction K includes the first and second reinforcing members 43 and 41, Since the first and second reinforcing members 43 and 41 securely couple the front pillar 17 and the dash panel 15 with each other and increase strength of the front pillar 17 itself, bending rigidity of the front portion of the vehicle body is improved.

Furthermore, in accordance with the present invention, the front body construction K includes the first and second gusset 47 and 48. Since the first and second gusset 47 and 48 securely couple the front pillar 17, the first reinforcing member 43 and the dash panel 15 with each other and increase strength of the front pillar 17 itself, bending rigidity of the front portion of the vehicle body is improved.

Moreover, in accordance with the present invention, the front body construction K includes the first and second side-sill reinforcements 35 and 37. Since the first and second side-sill reinforcements 35 and 37 securely couple not only the side sill 10 and the floor panel 26 with each other but also the dash panel 15 and the cowl side panel 23 with each other, bending rigidity of the front portion of the vehicle body is improved.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A front body construction for a motor vehicle, comprising:

a dash panel which extends in a sidewise direction of a vehicle body of said motor vehicle so as to form a front face of a cabin of said motor vehicle;

a pair of cowl side panels each of which is coupled, at a front end thereof, with said dash panel so as to form a front portion of each of a pair of side walls of said cabin;

a pair of front pillars each of which is disposed inwardly of a rear portion of each of said cowl side panels in the sidewise direction of said vehicle body; and a pair of first reinforcing members each of which is coupled, at a front end thereof, with said dash panel and is coupled, at a rear end thereof, with a rear end portion of each of said front pillars;

said first reinforcing members each defining, at a front portion thereof, a first closed cross section in cooperation with each of said cowl side panels and each defining, at a rear portion thereof, a second closed cross section in cooperation with each of said front pillars.

2. A front body construction as claimed in claim 1, further comprising:

a pair of side sills each having a closed cross section, which extend in a longitudinal direction of said vehicle body; and a pair of wheel housings;

said front pillars each including an outer member and an inner member;

said first reinforcing members each extending, above each of said side sills, in the longitudinal direction of said vehicle body;

each of said first reinforcing members being attached, at a front end thereof, to an upper portion of said dash panel and each of said wheel housings and being attached, at a rear end thereof, to a rear edge portion of said inner member of each of said front pillars.

3. A front body construction as claimed in claim 2, further comprising;

a pair of auxiliary reinforcing members each of which has one edge and the other edge;

each of said first reinforcing members including a front portion and a rear portion such that said one edge of each of said auxiliary reinforcing members is attached to a boundary portion of said front portion and said rear portion of one of said first reinforcing members;

said other edge of each of said auxiliary reinforcing members being attached to said inner member of each of said front pillars.

4. A front body construction as claimed in claim 2, further comprising a pair of second reinforcing members;

each of said second reinforcing members being provided about each of said side sills so as to define, in cooperation with each of said cowl side panels, a closed cross section juxtaposed relative to each of said side sills such that a lower edge of each of said first reinforcing members is attached to an upper portion of each of said second reinforcing members.

5. A front body construction as claimed in claim 4, further comprising:

a floor panel which is attached, at a side edge thereof, to a lower jointing flange of each of said side sills;

said side sills and said floor panel being attached, at front ends thereof, to a lower portion of said dash panel;

said side sills each including an inner member and an outer member; and a pair of second side-sill reinforcements for reinforcing said side sills, respectively, each of which has a substantially L-shaped cross section and is attached, at one edge thereof, to said inner member of each of said side sills and is attached, at the other edge thereof, to an upper face of said floor panel so as to define, in cooperation with said floor panel, a closed cross section juxtaposed relative to each of said side sills;

said second side-sill reinforcements each being attached, at a front end thereof, to said dash panel;

each of said second reinforcing members being attached, at a lower edge thereof, to an upper face of each of said second side-sill reinforcements.

6. A front body construction as claimed in claim 1, further comprising:

a pair of side sills each having a closed cross section, which extend in a longitudinal direction of said vehicle body; and a pair of second reinforcing members;

each of said second reinforcing members being provided above each of said side sills so as to define, in cooperation with each of said cowl side panels, a closed cross section juxtaposed relative to each of said side sills.

7. A front body construction as claimed in claim 6, wherein each of said second reinforcing members extends rearwardly in the longitudinal direction of said vehicle body such that a rear portion of each of said second reinforcing members defines, in cooperation with a lower portion of each of said front pillars and an upper face of each of said side sills, a closed cross section.

8. A front body construction as claimed in claim 1, further comprising:

a pair of first gussets each having a hat-like cross section, each of which is disposed in a closed cross section defined by each of said reinforcing members and each of said cowl side panels and is attached, at a front end thereof, to each of said cowl side panels and is attached, at a rear end thereof, to each of said front pillars;

said first gussets each having a projecting portion projecting towards each of said first reinforcing members; and a pair of second gussets each of which is disposed at a corner formed by each of said first reinforcing members and said dash panel so as to confront said cabin and is attached, at one end thereof, to said dash panel and is attached, at the other end, to said projecting portion of each of said first gussets through each of said first reinforcing members.

9. A front body construction as claimed in claim 1, further comprising:

a pair of side sills each having a closed cross section, which extend in a longitudinal direction of said vehicle body;

a floor panel which is attached, at a side edge thereof, to a lower jointing flange of each of said side sills;

said side sills and said floor panel being attached, at front ends thereof, to a lower portion of said dash panel; and a pair of side-sill reinforcements for reinforcing said side sills, respectively, each of which is attached, at one edge thereof, to each of said side sills and is attached, at the other edge thereof, to said floor panel so as to be juxtaposed, in cooperation with said floor panel, relative to each of said side sills.

10. A front body construction as claimed in claim 9, wherein each of said side-sill reinforcements includes a first side-sill reinforcement, said side sills each including an inner member and an outer member, said first side-sill reinforcement being attached, at a rear portion thereof, to a lower face of said floor panel and said outer member of each of said side sills such that said rear portion of said first side-sill reinforcement interposes said lower jointing flange of each of said side sills;

said first side-sill reinforcement being attached, at a front portion thereof, to said dash panel and each of said cowl side panels such that said front portion of said first side-sill reinforcement interposes a jointing flange of said dash panel and a jointing flange of each of said cowl side panels, whereby a closed cross section extending in the longitudinal direction of said vehicle body is formed by said first side-sill reinforcement.

11. A front body construction as claimed in claim 10, wherein each of said side-sill reinforcements further includes a second side-sill reinforcement, said second side-sill reinforcement having a substantially L-shaped cross section and being attached, at one edge thereof, to said inner member of each of said side sills and being attached, at the other edge thereof, to an upper face of said floor panel so as to define, in cooperation with said floor panel, a closed cross section juxtaposed relative to each of said side sills such that a joint portion of said first side-sill reinforcement with respect to said floor panel and said other edge of said second side-sill reinforcement confront each other through said floor panel, said second side-sill reinforcement being attached, at a front end thereof, to said dash panel.

12. A front body construction as claimed in claim 9, wherein each of said side-sill reinforcements includes a second side-sill reinforcement, said side sills each including an inner member and an outer member, said second side-sill reinforcement having a substantially L-shaped cross section and being attached, at one edge thereof, to said inner member and being attached, at the other edge thereof, to an upper face of said floor panel so as to define, in cooperation with said floor panel, a closed cross section juxtaposed relative to each of said side sills, said second side-sill reinforcement being attached, at a front end thereof, to said dash panel.

* * * * *